United States Patent [19]
van Hoff

[11] Patent Number: 5,950,008
[45] Date of Patent: *Sep. 7, 1999

[54] SYSTEM AND METHOD FOR RESOLVING SYMBOLIC REFERENCES TO EXTERNALLY LOCATED PROGRAM FILES

[75] Inventor: Arthur A. van Hoff, Mountain View, Calif.

[73] Assignee: Sun Microsystems, Inc., Mountain View, Calif.

[*] Notice: This patent is subject to a terminal disclaimer.

[21] Appl. No.: 08/958,457

[22] Filed: Oct. 27, 1997

Related U.S. Application Data

[62] Division of application No. 08/569,748, Dec. 8, 1995, Pat. No. 5,727,147.

[51] Int. Cl.⁶ .............................. G06F 9/24; G06F 13/38
[52] U.S. Cl. .............. 395/707; 395/200.33; 395/200.42; 395/200.47; 395/200.31
[58] Field of Search ..................... 395/200.31, 200.33, 395/200.42, 200.47, 684–685, 200.57, 200.49, 703, 705, 707, 200.55, 200.59, 500, 712, 702, 710; 707/103, 10, 100; 711/117–118

[56] References Cited

U.S. PATENT DOCUMENTS

| | | | |
|---|---|---|---|
| 5,347,632 | 9/1994 | Filepp et al. | 395/200.32 |
| 5,423,042 | 6/1995 | Jalili et al. | 395/684 |
| 5,630,066 | 5/1997 | Gosling | 395/200.51 |
| 5,699,518 | 12/1997 | Held et al. | 395/200.59 |
| 5,727,145 | 3/1998 | Nessett et al. | 395/186 |
| 5,727,147 | 3/1998 | Van Hoff | 395/200.3 |
| 5,748,897 | 5/1998 | Katiyar | 395/200.49 |
| 5,787,281 | 7/1998 | Schreiber et al. | 395/684 |

OTHER PUBLICATIONS

Ken Thompson, "Regular Expression Search Algorithm," *Communications of the ACM,* Jun. 1968, vol. 11, No. 6, pp., 419–422.

Kin–Man Chung and Herbert Yuen, "A 'Tiny' Pascal Compiler; Part 1: The P–Code Interpreter," *BYTE Publications, Inc.,* Sep. 1978.

Kin–Man Chung and Herbert Yuen, "A 'Tiny' Pascal Compiler; Part 2: The P–Compiler," *BYTE Publications, Inc.,* Oct. 1978.

(List continued on next page.)

*Primary Examiner*—James P. Trammell
*Assistant Examiner*—Cuong H. Nguyen
*Attorney, Agent, or Firm*—Gary S. Williams; Pennie & Edmonds LLP

[57] ABSTRACT

When an interpreter on a client computer encounters a symbolic reference to a remotely stored method while interpreting a locally stored method, and the object class for the remotely stored method has not previously been loaded, the client computer, the client computer creates an application specific loader that is then used to load the remotely stored method into the client computer. The application specific class loader contains location information associated with the server computer on which the remotely stored method is stored, and also contains methods for loading onto the client computer the object class for the remotely stored method as well as the object classes for any additional methods referenced by that method. The application specific class loader preferably also includes symbol table for storing information about method references that have been resolved by the application specific class loader. Each method in the object classes loaded by the application specific class loader is modified when it is loaded to reference the application specific class loader, thereby linking the loaded method to the application specific class loader. The reference to the application specific class loader in the loaded method is used by the interpreter to determine which class loader to use when resolving symbolic references in the loaded method to other methods. The methods of the application specific class loader may incorporate load policies associated with the server location and different from the load policies used by the client computer's bootstrap class loader.

11 Claims, 5 Drawing Sheets

OTHER PUBLICATIONS

Gene McDaniel, "An Analysis of a Mesa Instruction Set," *Association for Computing Machinery,* May 1982.

Kenneth A. Pier, "A Retrospective on the Dorado, A High-Performance Personal Computer," *IEEE Computer Society, 10th Annual Intl. Symposium on Computer Architecture,* 1983, pp. 252–269.

James G. Mitchell, et al., "Mesa Language Manual," *Xerox Corporation, Palo Alto Research Center.*

SYSTEM AND METHOD FOR RESOLVING SYMBOLIC REFERENCES TO EXTERNALLY LOCATED PROGRAM FILES

This application is a continuation of Ser. No. 08/569,748, filed Dec. 8, 1995, now U.S. Pat. No. 5,727,147 issued on Mar. 10, 1998.

The present invention relates generally to object oriented distributed computer systems, and particularly to a program execution system and method in which a source program may reference, via symbols, methods (i.e., programs) stored at remote locations.

BACKGROUND OF THE INVENTION

An interpreter is a computer program that translates and executes instructions written in a programming language, such as programs written in the Java bytecode language. The translation process involves the conversion of each source language statement of a given computer program into machine language suitable for execution. A user wishing to execute an application program written in the programming language will invoke an interpreter in order to execute the application program.

In object oriented programming languages, every object belongs to a specific "class," sometimes called an object class. Every object is an instance of a respective object class. Further, programs in object oriented computer systems are often called "methods," and each method belongs to a respective object class.

Methods (particularly application programs) often contain references to other methods that are located separate and apart from the calling method. Typically, these references take the form of a unique name or symbol which corresponds to the particular sub unit of code. As part of the interpretation process required to execute a given method, the interpreter must resolve each reference or symbol in order to locate and ultimately translate the method associated with a given symbol.

In the prior art, the interpretation process for a symbolic reference to a method involved a one or two step process. Some prior art interpreters utilize local system resources (libraries and the like) to resolve symbolic references. In the event the local system resources could not resolve a given symbol, then the interpretation (compilation) aborts with an appropriate message to the user. In other prior art interpreters, if the local resources could not resolve a symbolic reference, then a search strategy is invoked. The particular search strategy invoked by the interpreter may be unique to the individual computer. Accordingly, the ability of the interpreter to resolve these unknown (at least locally) symbolic references is directly related to the effectiveness of the resident search routine. Again, as with other prior art interpreters, if the symbol could not be resolved by the resident search routine, then the interpretation process aborts with an appropriate message to the user.

In a distributed computer system, a method being executed by a first (client) computer may contain references, herein called symbols, to methods located on a number of other (server) computers. In order to translate and execute a method which contains references to remotely stored methods, the program interpreter is required to resolve all of the references to remote methods. However, the local system resources (client resources) available to an interpreter to translate symbolic references may not be the same as the resources (server resources) available at the other server computers. Specifically, the resources available at a server computer may be more expansive or the server may employ a different search routine which has been tailored to the object classes stored at its location.

Furthermore, when a first method is loaded from a remote server, any additional methods called by the first method are likely to be located on the same remote server that supplied the first method. Importantly, the remote server may store a version of the called method that is required for correct operation of the first method. In other words, there may be many methods having the same name that are located on various client and server computers. Thus, when Method A on Server 1 makes a call to Method X, and different versions of Method A are stored on various servers and clients, Method X on Server 1 most likely needs to use the Server 1 version of Method X. Therefore, in most circumstances, the first place to look for such called methods would be that same remote server.

However, if the client's default class loading procedure is used to locate and load these called methods, local resources will be searched first, and the search for the called methods either may never be extended to the remote server, or may extend to the remote server only after an unfruitful search of the local resources. This is wasteful, and may result in the wrong method (i.e., the local version of the called method instead of the remotely stored version) being loaded.

It is therefore an object of the present invention to provide a method and system for resolving symbolic references to remotely located methods. It is an associated object of the present invention to provide a method and system in which the default search strategy for locating a called method is superseded by an application specific search strategy when the calling method was loaded by the executing client computer from a remotely located server.

SUMMARY OF THE INVENTION

In summary, the present invention is a program interpreter, and method, for interpreting object oriented programs in a computer system having a memory that stores a plurality of objects and a plurality of methods. In a preferred embodiment, the program interpreter resolves references to remotely located methods called while interpreting a first method. When the program interpreter on the client computer encounters a reference to a second, remotely stored method, the client computer creates an application specific class loader which contains location information indicating the server computer on which the referenced method is stored. The application specific class loader is then used to load the object class associated with the second method from the server computer location indicated in the application specific class loader. The application specific class loader is utilized to resolve all method calls, in the form of symbolic references, within the second method.

A separate application specific class loader is created for each reference encountered while interpreting a locally stored first method to methods stored on remotely located servers, unless the object class for the referenced method has already been loaded (e.g., in response to a previously encountered method call for the same or a different method in the same object class). The application specific class loaders are created by a bootstrap class loader that also handles the loading of locally stored object classes. The application specific class loaders handle the loading of remotely located object classes. The methods of each application specific class loader may incorporate load policies associated with the respective server location, which differ from the load policies used by the client computer's bootstrap class loader.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1A:
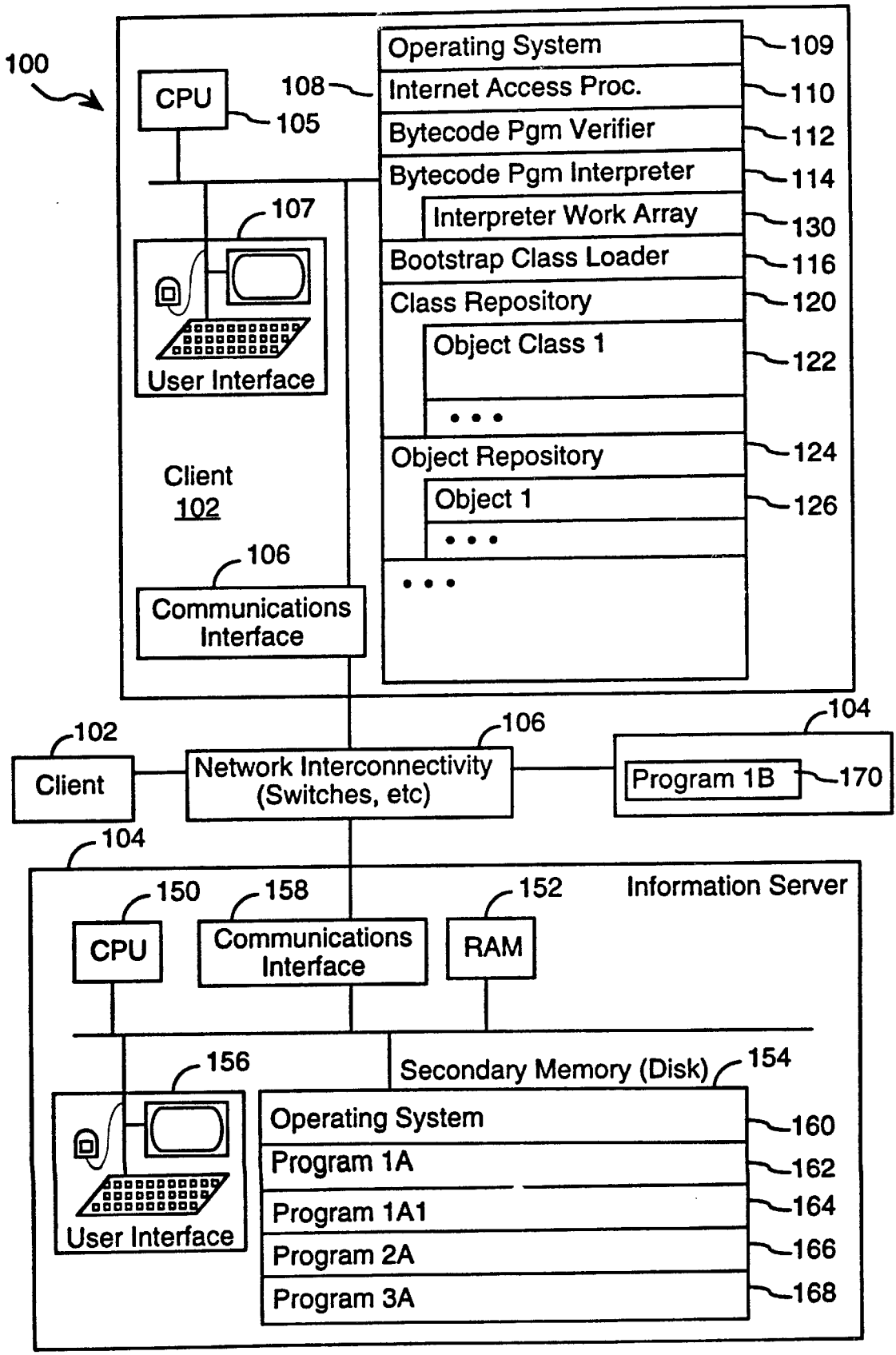
FIGS. 1A and 1B are block diagrams of a distributed computer system incorporating the present invention.

Referring to FIG. 1, there is shown a distributed computer system 100 having many client computers 102 and at least one remotely located information server computer 104. In the preferred embodiment, each client computer 102 is connected to the information servers 104 via the Internet 103, although other types of communication connections could be used. While most client computers are desktop computers, such as Sun workstations, IBM compatible computers and Macintosh computers, virtually any type of computer can be a client computer. In the preferred embodiment, each client computer includes a CPU 105, a communications interface 106, a user interface 107, and memory 108. Memory 108 stores:

an operating system 109;

an Internet communications manager program 110;

a bytecode program verifier 112 for verifying whether or not a specified program satisfies certain predefined integrity criteria;

a bytecode program interpreter 114 for executing bytecode programs (i.e., methods);

a bootstrap class loader 116, which loads object classes into a user's address space and utilizes the bytecode program verifier to verify the integrity of the methods associated with each loaded object class;

at least one class repository 120, for locally storing object classes 122 in use and/or available for use by user's of the computer 102;

at least one object repository 124 for storing objects 126, which are instances of objects of the object classes stored in the object repository 120.

In the preferred embodiment the operating system 109 is a object oriented multitasking operating system that supports multiple threads of execution within each defined address space. Furthermore, in the preferred embodiment, the bytecode program verifier 112 and interpreter 114 are a Java bytecode program verifier and interpreter for working with Java bytecode programs. Java is a platform independent language and technology marketed by Sun Microsystems, Inc. In addition, the Internet access procedure 110 in the preferred embodiment is the HotJava browser, and is embodied as a method in an associated object class that is stored in a local class repository 120 in the client computers memory 108.

The bootstrap class loader 116 is typically invoked when a user first initiates execution of a method, requiring that an object of the appropriate object class be generated. The class loader 116 loads in the appropriate object class and calls the bytecode program verifier 112 to verify the integrity of all the bytecode programs in the loaded object class. If all the methods are successfully verified an object instance of the object class is generated, and the bytecode interpreter 114 is invoked to execute the user requested method. If the method requested by the user is not a bytecode program and if execution of the non-bytecode program is allowed (which is outside the scope of the present document), the program is executed by a compiled program executer (not shown).

The bootstrap class loader 116 is also invoked whenever an executing bytecode program encounters a call to an object method for an object class that has not yet been loaded into the user's address space. Once again the class loader 116 loads in the appropriate object class and calls the bytecode program verifier 112 to verify the integrity of all the bytecode programs in the loaded object class. If all the methods in the loaded object class are successfully verified, an object instance of the object class is generated, and the bytecode interpreter 114 is invoked to execute the called object method.

As will be explained in more detail below, the bootstrap class loader 116 is not used in the present invention to load object classes from remotely located computers, such as one of the servers 104 shown in FIG. 1. Rather, an application specific class loader is generated by the bootstrap class loader, and then that application specific class loader is used to load the remotely located object class.

The term "method" is used in this document synonymously with the terms "program" and "application program" to refer to a program that is in an object class.

Figure 1B:
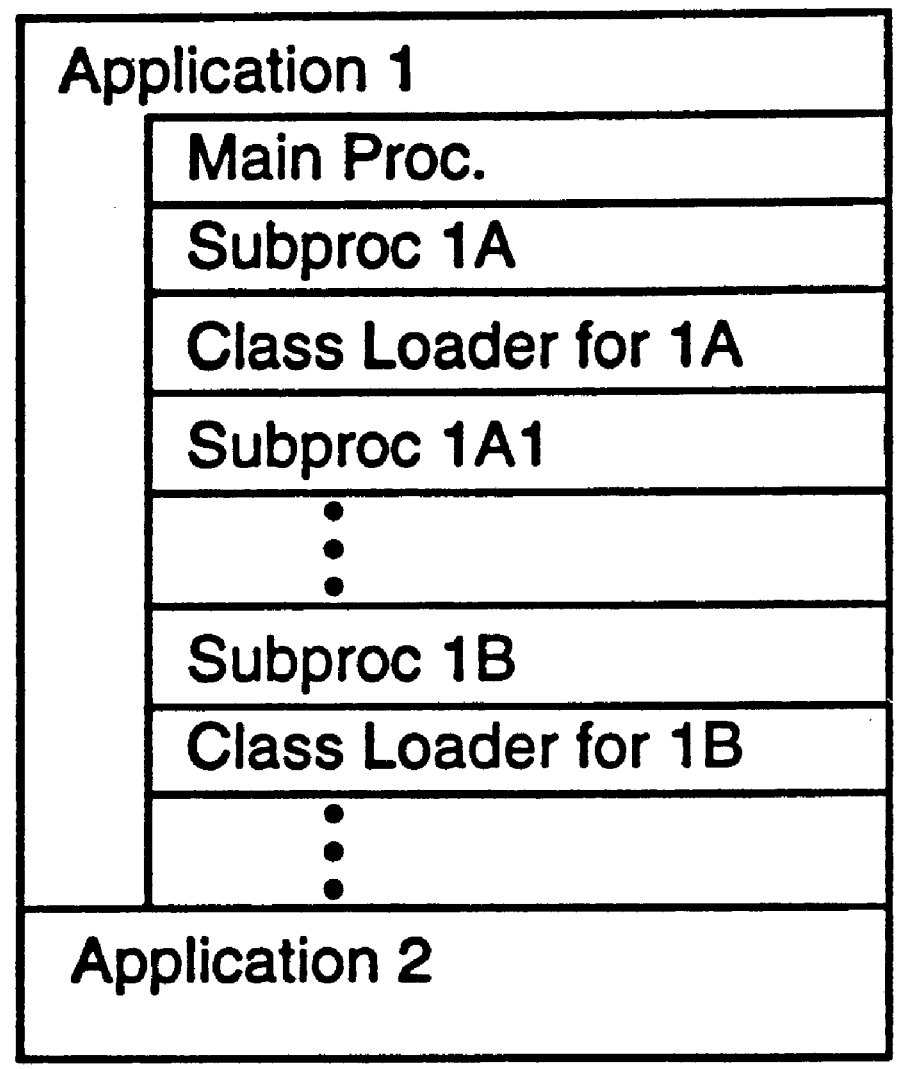

As shown in FIGS. 1A and 1B, the bytecode program interpreter 114 includes a work array 130 in which a working representation of all currently loaded and executing methods are temporarily stored.

The information server 104 includes a central processing unit 150, primary memory 152 (i.e., fast random access memory) and secondary memory 154 (typically disk storage), a user interface 156, a communications interface 158 for communication with the client computers 102 via the communications network 106. For the purposes of the present discussion, it will be assumed that the information server's secondary memory 154 stores:

an operating system 160, and program source files 162, 164, 166, 168.

A second server computer 104 includes the same basic elements (not shown) and a memory for storing a program 170.

As is often the case, a user operating a browser such as HotJava on the Internet may desire to load from a remote location on the internet an application program for execution locally on the user's client computer. In order to do so, the user will invoke the class loader associated with the browser application, often referred to as the bootstrap class loader 116. The bootstrap class loader 116 creates a local copy of the object class associated with the user selected application program and prepares the method or methods in that object class for local execution.

Figure 2:
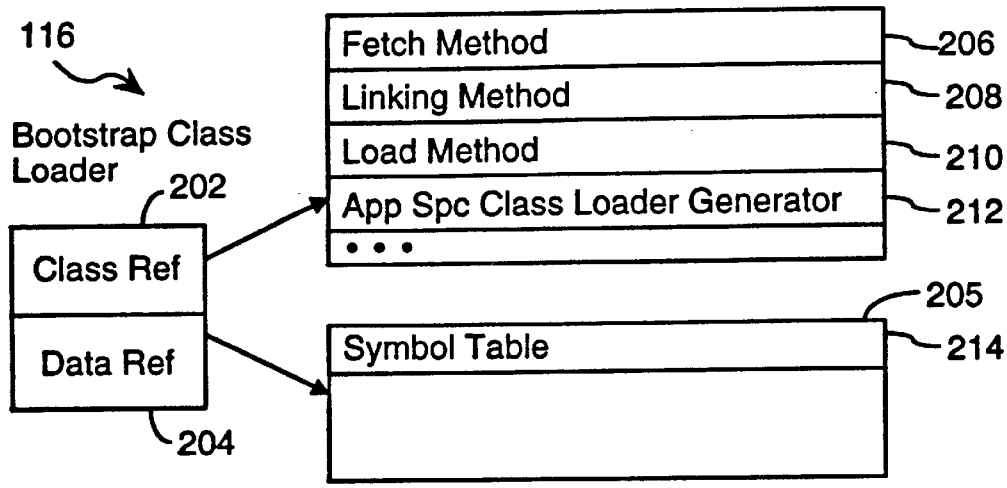
FIG. 2 is a block diagram of a bootstrap class loader according to one embodiment of the present invention.

Referring now to FIG. 2, a bootstrap class loader 116 according to one embodiment of the present invention is shown. The bootstrap class loader 116 includes both a class reference 202 that points to a set of methods in the associated object class, and a data reference 204 that points to a data array 205. The methods in the bootstrap class loader object class include a fetch method 206, a linking method 208, a load method 210, and an application specific class loader generator method 212.

The fetch method 206 includes the methods required to fetch (i.e., locate and copy) a locally stored object class, as well as to determine if the object class containing a referenced method is stored at a remote location. Linking method 208 includes a method for linking the methods in the fetched object class to the bootstrap class loader by modifying the code of those methods to include a constant or variable (e.g., a variable named ClassLoader) whose value identifies the class loader used to load the fetched object class. The load method 210 includes a method for loading the fetched and linked object class into the program interpreter. The application specific class loader generator method 212 includes a method for generating application specific class loaders.

The data array 205 includes a symbol table 214 associated with the bootstrap class loader 116. The symbol table 214 includes a list of symbols previously resolved by the class loader as well as data indicating the exact location of the code associated with the symbolic references.

Figure 3:
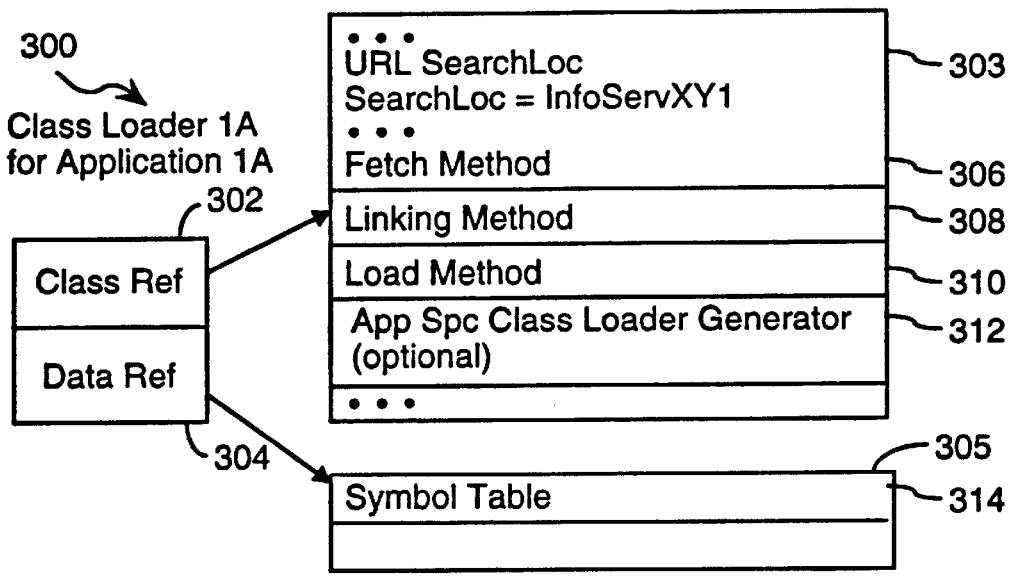
FIG. 3 is a block diagram of an application specific class loader according to one embodiment of the present invention.

Referring now to FIG. 3, an application specific class loader 300 as created by the application specific class loader generator method 212 of the present invention is shown. The generator method 212 creates an application specific class loader 300 which will be linked to an application program (i.e., method) in an object class that has been loaded from a remote server. The application specific class loader 300 itself contains both a class reference 302 and a data reference 304 to a data array 305. The class reference points to a set of methods that include: 1) location information 303 for a remotely located server computer, typically a server computer; 2) a fetch method 306 for fetching object classes from a remote server computer to a client computer; 3) a linking method 308; 4) a load method 310, and, in some embodiments, 4) an application specific class loader generator method 312.

The location information 303 identifies the particular server computer on which an object class referenced by a locally stored method is stored. The location information 303 is preferably embedded in the fetch method 306.

In one embodiment, fetch method 306 is the same fetch method 206 found in the bootstrap class loader 116, except that it includes the location information 303 needed to locate the server from which additional object classes are to be loaded. In an alternative embodiment, the fetch method 306 is customized to the server computer and includes policy checks implemented by the server computer. In this alternative embodiment, the fetch method 306 incorporates policy considerations, including limitations proscribed by either the source or the destination of the object class to be relocated. For example, limitations on the set of resources to be searched (e.g., which object class repositories, and which other servers, if any) to locate a called method may be incorporated into the fetch method 306. For instance, the fetch method in all application specific class loaders can be coded to invoke a search strategy procedure having a predefined name, such as "SearchPolicyProc," that if present on a server invokes the object class fetch policies of that server computer. If the SearchPolicyProc is not present on the server, the version of that procedure on the client computer is used.

In the preferred embodiment, the linking method method 308 is the same as the linking method method 208 as described in association with the bootstrap class loader 116. The load method 310 is also the same as the load method 210 as described in association with the bootstrap class loader 116. In the preferred embodiment, application specific class loaders do not include an application specific class loader generator method 312, because it is assumed that all symbol references to be resolved by the application specific class loader will be successfully resolved by locating an associated object class on either the server identified by the location information 303, on any other server computers referenced by the search policy of the identified server computer, or on the client computer.

As indicated above, it is possible that the application specific class loader 300 will search for the object class corresponding to a called method not only on the server specified by the location information, but on other servers as well. In an alternate embodiment, when the object class for the called method is located on a different server than the one identified by the location information 303, a new application specific class loader is generated for that called method by the generator method 312. The new application specific class loader is then used to load the object class on that other server as well as to locate and load the object classes for any method calls made by that method. In this way, the application specific class loader 300 is capable of constructing other application specific class loaders.

The data array 305 for the application specific class loader includes a symbol table 314. The symbol table 314 includes a list of resolved symbols as well as data indicating the exact location of the code associated with the symbolic references.

Figure 4:
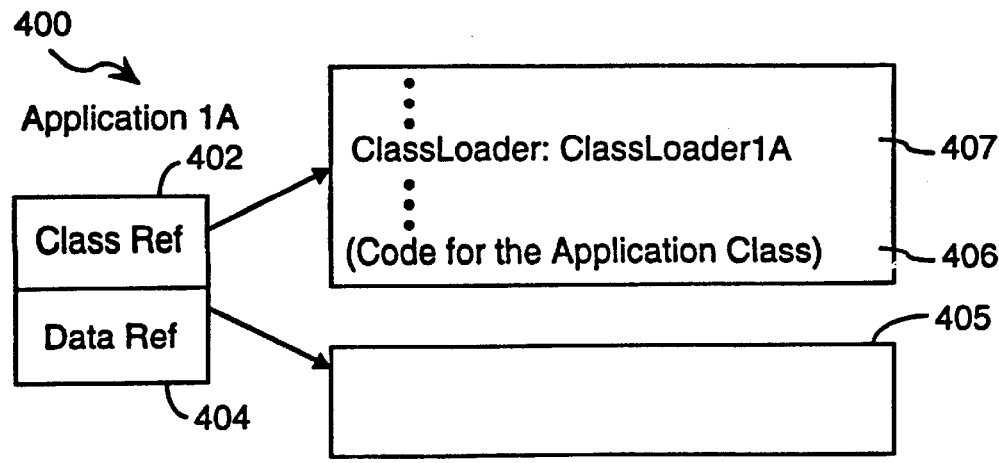
FIG. 4 is a block diagram of an object loaded by the application specific class loader of FIG. 3.

FIG. 4 shows the data structure for an object 400 that is an instance of an object class loaded by an application specific class loader. The object 400 includes a class reference pointer 402 to an array of methods and a data reference pointer 404 to a data array 405. The methods in the methods array include at least one method 406, and each of those methods includes code 407 (i.e. a program instruction) defining a constant or variable whose value identifies the class loader used to load the associated object class. Program code 407 is sometimes referred to as the class loader ID. The class loader identified by the class loader ID 407 is the bootstrap class loader if the object class was loaded by the bootstrap class loader, and is otherwise the application specific class loader that was used to load the object class.

As explained above, the linking method 208, 308 modifies each of the methods in an object class during the loading process so as to insert the declaration of the associated class loader ID 407.

Data array 405 stores any data and pointers that may be necessary to execute the underlying methods of the object 400.

Figure 5:
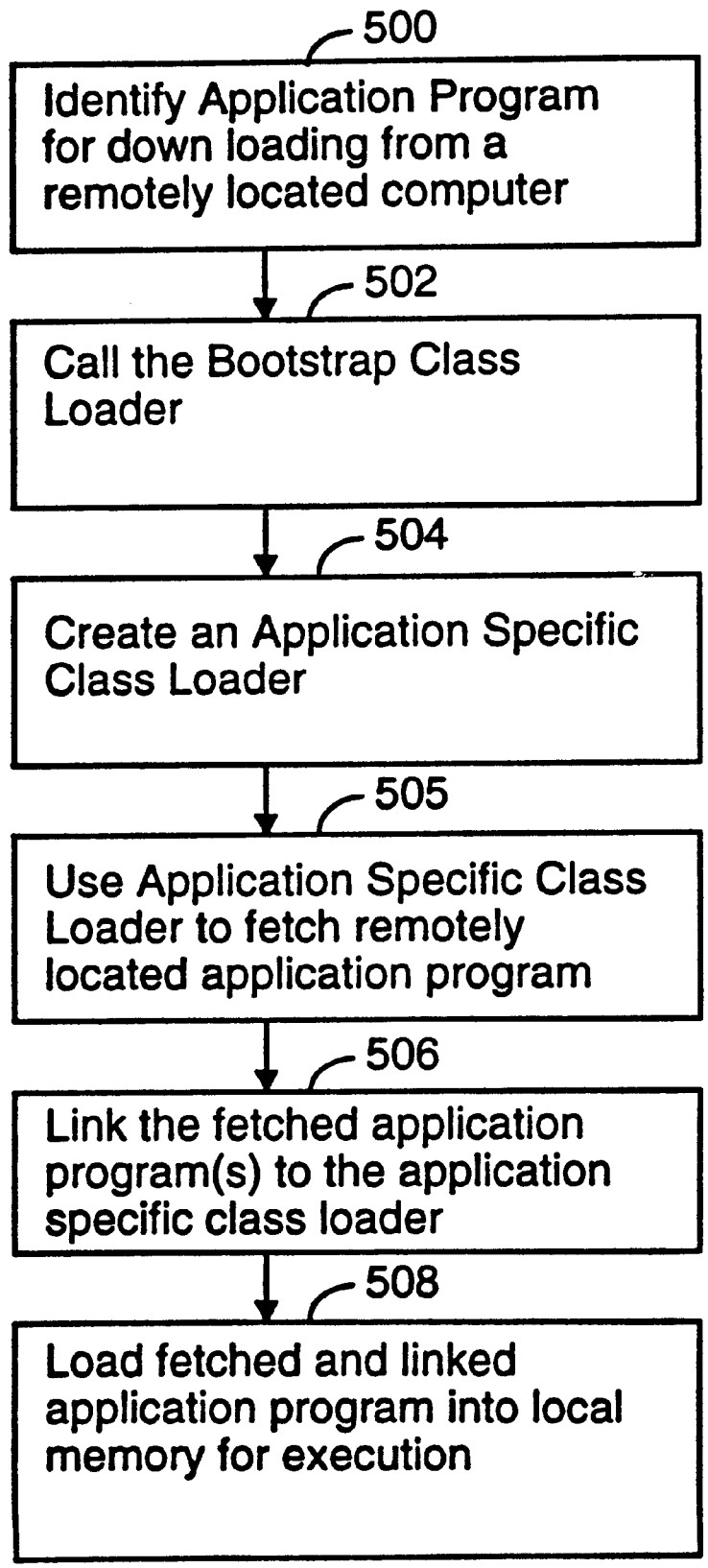
FIG. 5 is a flow chart of a method for loading the object class associated with an application program from a server computer according to the present invention.

Referring now to FIG. 5, a flow chart associated with the loading of an application program from a remote server computer according to the present invention is shown. A user operating a browser, such as HotJava, identifies an application program (i.e., method) for downloading to local memory in his or her respective client computer (500). Alternately, execution of a method previously launched encounters a reference to a method whose object class is stored on a remote server computer. The browser initiates the loading of the object class associated with the identified method into local memory by invoking the bootstrap class loader (502).

Assuming that the object class for the identified method has not already been loaded into the client computer, the bootstrap class loader creates an application specific class loader for the identified method (504). The application specific class loader includes embedded location information for identifying the server computer on which the identified application program is stored. In addition, the application specific class loader includes a method, or instructions, for loading object classes from the server computer to the client computer on which the application specific class loader resides. Finally, in some embodiments, the application specific class loader includes instructions for creating other application specific class loaders.

After creating the application specific class loader, the bootstrap class loader calls the main method of the application specific class loader, which in turn fetches the object class for the identified method from the server computer (505), links it to the application specific class loader (506) and then loads it into the program interpreter for execution (508). Thus, the process of loading the identified method from the remotely located server computer is handled by the application specific class loader.

The identified method is now available to be interpreted (translated and executed) on the local client computer.

As was described previously, a Java bytecode application program must be translated prior to execution. The translation process is performed by a program interpreter 114. In order to successfully translate the application program, all symbolic references must be resolved. A pseudocode representation of the interpretation process is shown in Table 1. The pseudocode used in Table 1 utilizes universal computer language conventions. While the pseudocode employed here has been invented solely for the purposes of this description, it is designed to be easily understandable by any computer programmer skilled in the art.

Figure 6:
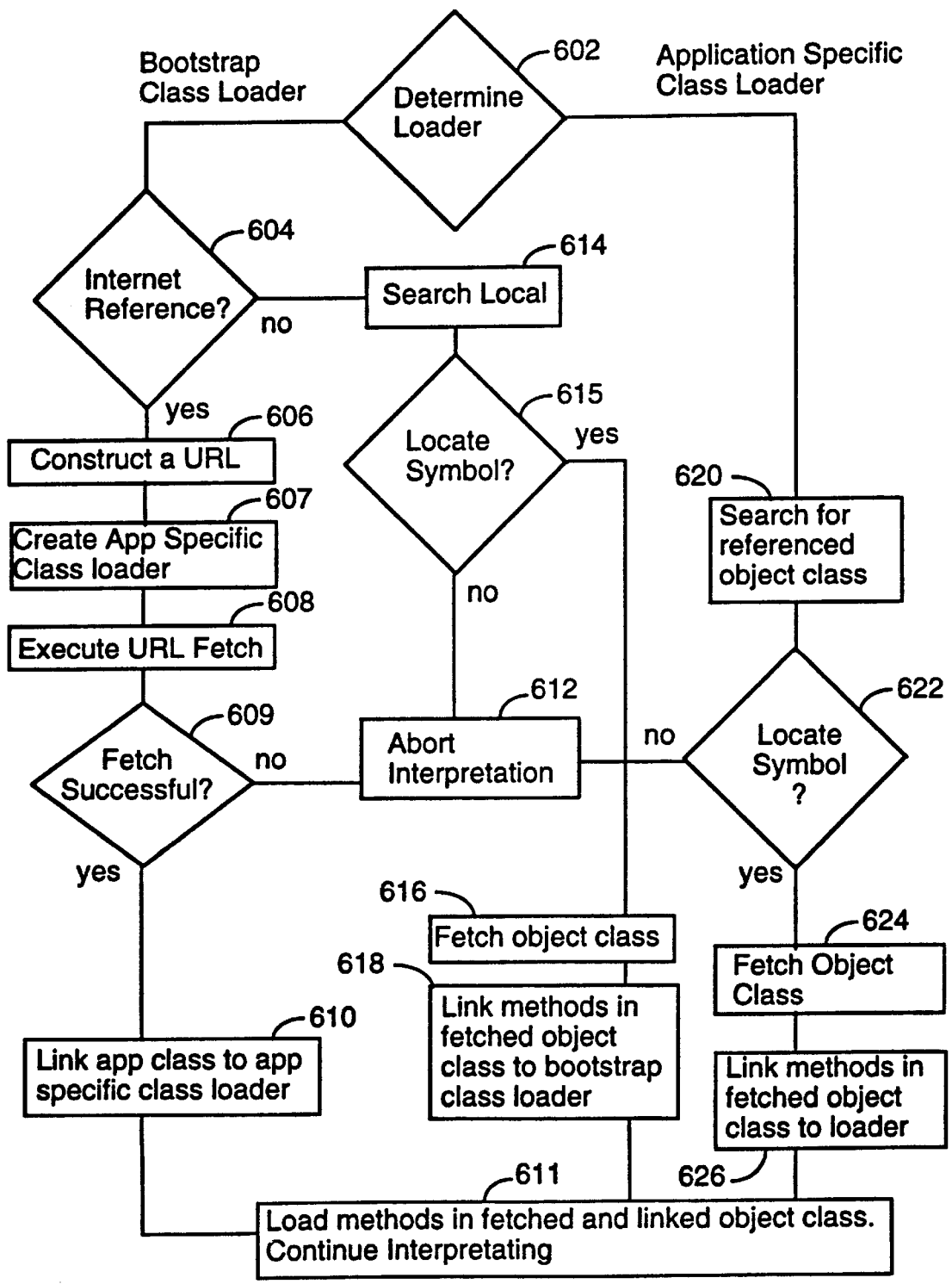
FIG. 6 is a flow chart of a method for translating an unresolved symbolic reference by an interpreter according to the present invention.

Referring now to FIG. 6, a flow chart for resolving symbolic references by utilizing the system and methods of the present invention is shown. The interpreter begins the resolution process by determining the class loader which is associated with the application program being interpreted 602.

If the class loader associated with the application program is the bootstrap class loader, then a determination is made if the symbolic reference is a Internet reference to a remotely located file (i.e., object class) 604. If so, then the interpreter constructs a URL for the symbol 606, creates an application specific class loader, and then uses the application specific class loader to execute a URL based fetch of the remotely stored file 608.

If the fetch is successful (609-Y), then the application specific class loader links the methods in the fetched object class to the application specific class loader 610. The methods of the fetched and linked object class are then loaded into the program interpreter so that the interpretation process then can proceed with interpreting the referenced method in the fetched object class 611. If the fetch is unsuccessful (609-N), then the interpretation process is aborted 612.

If the symbolic reference is not an Internet reference (604-NO), then a search of the local resources in a predefined search list is performed 614. If the object class containing the referenced method is located in the local resources (615-YES), then the bootstrap loader is used to fetch the object class 616, link the methods of the fetched object to the bootstrap class loader 168 and load the methods of the fetched and linked object class into the program interpreter 611 so that the program execution (i.e., interpretation) process can continue. Otherwise, if the object class containing the referenced method is not found (615-NO), the interpretation process is aborted 612.

If the loader associated with the application program is an application specific class loader (602), then the identified class loader is utilized to load the object class associated with the symbolic reference (620, 622, 624, 626, 611). In most embodiments, a search 620 for the object class is performed at the server computer identified by the location information in the application specific class loader. If the object class associated with an unresolved symbol is not found at the server identified by the location information in the application specific class loader, the application specific class loader will then preferably search for the required object class at other locations, including the client computer and possibly at other servers. In some implementations the resources searched, and sequence in which they are searched, will be governed by a search list or procedure that is specific to the identified server computer, while in other embodiments a standard search procedure will be used to attempt to locate the object class on the identified server computer. If the referenced object class is not found (622-NO), then the interpretation process is aborted 612.

If the referenced object class is located (622-YES), then the object class is fetched 624 and linked to the application specific class loader 626 so that any method calls within the methods of the just loaded object class will be resolved by the application specific class loader.

In one preferred embodiment, yet another application specific class loader is created if the object class to be loaded is located on a different server than the one identified by the class loader ID 407 in the calling method. In that embodiment, the newly created application specific class loader is used to load the object class containing the called method and the methods in that object class are linked to the newly created application specific class loader.

Accordingly, while one class loader may be associated with the base application program, each symbolic reference in the base application program may itself thereafter be associated with a distinct class loader. In this way, programs embedded within programs will have associated a specific class loader that is utilized to resolve symbolic references embedded therein.

One practical effect produced by the use of application specific class loaders is that the identical symbol in two or more application programs may be resolved as references to completely different object classes. For instance, consider the set of application programs shown in Table 2. RemoteProgram2 and RemoteProgram3 are loaded from distinct servers and therefore distinct application specific class loaders will be generated when each of these two programs are loaded by the bootstrap class loader.

In addition, each of these two programs references a program XYZ. The reference to XYZ in RemoteProgram2 will be resolved by the application specific class loader for RemoteProgram2, which will search for the object class for the XYZ program on server 2. On the other hand, the reference to XYZ in RemoteProgram3 will be resolved by the application specific class loader for RemoteProgram3, which will search for the object class for the XYZ program on server 3. If both server 2 and server 3 have different XYZ object classes, then two different versions of the XYZ method will be loaded into the computer that is executing ApplicationProgram1, one of which will be used to execute the Call XYZ instruction in RemoteProgram2 and the other of which will be used to execute the Call XYZ instruction in RemoteProgram3.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Program Interpreter Method

```
Procedure: Interpret (Method)
{
Verify (Method)
    If fail { Abort execution with appropriate message to user }
Execute Method
    {
    While executing method, resolve each unresolved Symbol
        that references another method:
        {
        Determine Class Loader for Method being interpreted
        If Class Loader is Bootstrap Class Loader
            {
            Parse Symbol
            If Symbol is an Internet reference to a method in a
                remotely object class
                {
                Construct URL for the symbol
                Generate Application Specific Class Loader,
                    including embedded location information
                    based on a portion of the constructed URL
                Use the Application Specific Class loader to
                    perform URL based fetch of the remotely
                    located object class
                If Fetch is unsuccessful
                    { Abort execution with appropriate message
                        to user }
                Link all methods in the fetched object class to the
                    Application Specific Class Loader
                Load the methods of the fetched object class into
                    the interpreter
                Interpret (referenced method in fetched object
                    class)
                }
            Else    /* Symbol is a local reference */
                {
                Search for referenced program in the resources
                    listed in a predefined Search List
                Attempt to load the object class associated with
                    the referenced program using the Bootstrap
                    Class Loader
                If unable to locate and load the object class for
                    the referenced method
                    { Abort execution with appropriate message
                        to user }
                Link all methods in the fetched object class to the
                    Bootstrap Class Loader
                Load the methods of the fetched object class into
                    the interpreter
                Interpret (referenced method in fetched object
                    class)
                }
            }
        Else    /* Class Loader is Application Specific */
            {
            Attempt to load the object class associated with the
                referenced method using the Application Specific
                Class Loader. (The Application Specific Class
                Loader searches for the object class containing
                the referenced method at the Internet site
                associated with the Application Specific Class
                Loader, and then if necessary searches at other
                locations such as the client computer. The
                Application Specific Class Loader enforces any
                associated program load policies.)
            If unable to locate and load the object class
                containing the referenced method
                { Abort execution with appropriate message to
                    user }
            Link all methods in the fetched object class to the
                Application Specific Class Loader
            Load the methods of the fetched object class into the
                interpreter
```

TABLE 1-continued

Pseudocode Representation of Program Interpreter Method

```
            Interpret (referenced method in fetched object class)
            }
        }
    }
}
```

TABLE 2

Example of Application Program

```
ApplicationProgram1          /* locally stored object class */
{
    ...
    Call RemoteProgram2
    ...
    Call RemoteProgram3
    ...
}
RemoteProgram2               /* loaded from server 2 */
{
    ...
    Call XYZ
    ...
}
RemoteProgram3               /* loaded from server 3 */
{
    ...
    Call XYZ
    ...
}
```

What is claimed is:

1. A computer program product for use in conjunction with a computer system, the computer program product comprising a computer readable storage medium and a computer program mechanism embedded therein, the computer program mechanism comprising:

a bootstrap class loader for loading application programs from locally stored object classes in a client computer;

the bootstrap class loader including symbolic reference resolution instructions for determining when resolution of a symbolic reference in a first application program to a second application program requires fetching the second application program from a respective server computer, and for creating an application specific class loader for loading programs from the respective server computer, the application specific class loader including location information identifying the respective server computer from which it loads programs;

linking instructions for modifying each application program loaded by the bootstrap class loader from the locally stored object classes to reference the bootstrap class loader and for modifying each application program loaded from the respective server computer to reference the application specific class loader; and an interpreter for executing the application programs and for resolving symbolic references in each application program by invoking the class loader referenced by the application program to load the application programs referenced by the symbolic references.

2. The computer program product of claim 1, the application specific class loader including symbolic reference resolution instructions that (a) determine whether an unresolved symbolic reference in a third application program references a fourth application program in an object class stored on the server computer identified by the location information in the application specific class loader, and (b) if the determination in (a) is positive, load the object class that contains the fourth application program from the server computer identified by the location information in the application specific class loader.

3. The computer program product of claim 2, the symbolic reference resolution instructions in the application specific class loader including instructions (c) that, when the determination in (a) is negative, abort execution of the third application program.

4. The computer program product of claim 1, wherein the application specific class loader includes symbolic reference resolution instructions that (a) determine whether an unresolved symbolic reference in a third application program references a fourth application program in an object class stored on any of a predefined set of computers that includes the client computer and the server computer identified by the location information in the application specific class loader, and (b) if the determination in (a) is positive, load the object class that contains the fourth application program from the computer on which the object class is stored.

5. The computer program product of claim 4, wherein the linking instructions include instructions for modifying each application program loaded by the application specific class loader to reference the application specific class loader.

6. The computer program product of claim 4, wherein the symbolic reference resolution instructions in the application specific class loader include instructions that, when the determination in (a) is negative, abort execution of the third application program.

7. A program interpreting method performed by a client computer for resolving symbolic references comprising the steps of:

(a) loading a first application program with a bootstrap class loader;

(b) executing application programs, including executing a first application program;

(c) while executing the first application program, determining whether resolution of a symbolic reference in the first application program to a second application program can be resolved locally, and when the determination is positive, loading the second application program by using the bootstrap class loader to load a corresponding object class stored in the client computer;

(d) when the determination in step c is negative, determining whether resolution of the symbolic reference in the first application program to the second application program requires fetching the second application program from a respective server computer, and when the determination in step d is positive, (d1) creating an application specific class loader for loading programs from the respective server computer, the application specific class loader including location information identifying the respective server computer from which it loads programs; and (d2) loading the second application program by using the application specific class loader to load a corresponding object class stored in the respective server computer;

(e) modifying each application program loaded by the bootstrap class loader from object classes stored in the client computer to reference the bootstrap class loader and modifying each application program loaded from the respective server computer to reference the application specific class loader.

8. The method of claim 7, including (f) using the application specific class loader to load object classes that contain programs referenced by symbolic references in the second application program.

9. The method of claim 7, including:

f) executing a third application program and upon encountering an unresolved symbolic reference to a fourth application program, determining whether the unresolved symbolic reference in the third application program references the fourth application program in an object class locally stored on the client computer;

g) if the determination in step f is positive, utilizing the class loader referenced by the third application program to load the object class that contains the fourth application program referenced by the symbolic reference in the third application program;

h) if the determination in step f is negative and the class loader referenced by the third application program is an application specific class loader, determining whether the unresolved symbolic reference in the third application program references the fourth application program in an object class stored on the server computer identified by the location information in the application specific class loader;

h1) if the determination in step h is positive, utilizing the application specific class loader referenced by the third application program to load the object class that contains the fourth application program; and h2) if the determination in step h is negative, aborting execution of the third application program; and i) if the determination in step f is negative and the class loader referenced by the third application program is the bootstrap class loader, i1) creating an application specific class loader;

i2) loading an object class from a remotely located computer that contains the fourth application program;

i3) modifying the loaded fourth application program to reference the application specific class loader created by step i1; and i4) using the application specific class loader created by step i1 to load object classes that contain programs referenced by symbolic references in the loaded fourth application program.

10. The method of claim 9, wherein step i1 includes embedding location information in the application specific class loader created by step i1, the location information identifying the remotely located computer from which the object class containing the fourth application program is loaded; and step i4 includes searching the remotely located computer identified by the location information embedded in the application specific class loader created by step i1 to locate a respective object class associated with each of the symbolic references in the loaded fourth application program.

11. The method of claim 10, including if step c4 fails to locate the respective object class on the remotely located computer, invoking a search for the respective object class on another computer.

* * * * *